United States Patent
Hennessey

(10) Patent No.: US 6,508,166 B1
(45) Date of Patent: Jan. 21, 2003

(54) DONUT MAKER

(75) Inventor: Christopher J. Hennessey, Stamford, CT (US)

(73) Assignee: Polyconcept USA, Inc., Stamford, CT (US)

( * ) Notice: Subject to any disclaimer, the term of this patent is extended or adjusted under 35 U.S.C. 154(b) by 0 days.

(21) Appl. No.: 10/219,371

(22) Filed: Aug. 15, 2002

(51) Int. Cl.[7] ............................. A47J 37/00; A47J 37/07
(52) U.S. Cl. ............................. 99/355; 99/373; 99/374; 99/375; 99/381; 99/382; 99/426; 99/442
(58) Field of Search ........................... 99/331–333, 339, 99/340, 352–355, 372–375, 380–383, 441, 426, 442, 444–450; 249/121, 122, 125, 115; 426/549, 551, 439, 499, 523; 425/287

(56) References Cited

U.S. PATENT DOCUMENTS

| | | |
|---|---|---|
| 53,744 A | 4/1866 | Mull |
| 137,142 A | 3/1873 | Machlet |
| 323,887 A | 8/1885 | Rutter |
| 853,060 A | 5/1907 | Carter |
| 1,638,673 A | 8/1927 | Wilcox |
| 1,663,719 A | 3/1928 | Morley |
| D77,875 S | 3/1929 | Bedel |
| 1,718,260 A | 6/1929 | Shaffer |
| 1,875,277 A | 8/1932 | Sweeney |
| 1,900,290 A * | 3/1933 | Kudo ........................ 99/426 X |
| 1,966,411 A | 7/1934 | Kaufmann ...................... 53/10 |
| 2,013,879 A | 9/1935 | Dillenback .................. 107/19 |
| 2,020,349 A | 11/1935 | Bennett et al. ................... 53/7 |
| 2,138,247 A | 11/1938 | Tatosian ....................... 107/58 |
| D119,081 S | 2/1940 | Weststrang |
| D175,547 S | 9/1955 | Josephson ....................... 81/10 |
| 3,236,196 A | 2/1966 | Ibex ............................ 107/54 |
| 3,638,583 A | 2/1972 | Goodier et al. ............. 249/122 |
| 3,727,875 A | 4/1973 | Downing .................... 249/121 |
| D233,302 S | 10/1974 | Trovinger |
| 3,857,330 A * | 12/1974 | Ruckstaetter ............. 99/355 X |
| 4,054,086 A | 10/1977 | McNair |
| 4,066,797 A | 1/1978 | McNair |
| D250,447 S | 12/1978 | Levin |
| D253,218 S | 10/1979 | Johnson |
| 4,175,483 A | 11/1979 | Clark |
| 4,224,863 A | 9/1980 | Barber et al. |
| 4,297,941 A | 11/1981 | Gallina |
| 4,512,250 A | 4/1985 | Schindler et al. |
| 5,191,830 A * | 3/1993 | Jacobson ................ 249/122 X |
| D353,968 S | 1/1995 | Cock |
| 5,642,659 A | 7/1997 | Sesona et al. |
| 5,871,661 A * | 2/1999 | Swisher .................. 249/122 X |
| D414,075 S | 9/1999 | Mishan |
| 5,988,048 A * | 11/1999 | Hunter et al. ............. 99/442 X |
| 6,214,399 B1 | 4/2001 | Garbo |

* cited by examiner

Primary Examiner—Timothy F. Simone
(74) Attorney, Agent, or Firm—Notaro & Michalos P.C.

(57) ABSTRACT

A donut making arrangement includes a drip tray for placement over a source of cooking heat, and a donut maker with base and cover. The base has a head defining a recess for receiving batter and cover has a lid for engaging over the recess. The head and lid have shapes and sizes to engage into the opening so that when the batter has been cooked to a selected extent on one side, aligned handles connected to the head and lid are used to turn the donut maker over to cook the batter on the opposite side to create a donut.

12 Claims, 5 Drawing Sheets

DONUT MAKER

FIELD AND BACKGROUND OF THE INVENTION

The present invention relates generally to the field of cooking equipment and in particular to a new and useful donut making arrangement.

Pancake makers are know from U.S. Pat. No. 5,642,659, for example, which can cook both sides of food by flipping the cooking apparatus over a source of cooking head.

U.S. Pat. No. 4,297,941 discloses an apparatus for simultaneously cooking both sides of a saucer shaped sandwich.

A need remains to an arrangement for conveniently cooking donuts or donut shaped foods.

SUMMARY OF THE INVENTION

It is an object of the present invention to provide a donut making arrangement that includes a drip tray for placement over a source of cooking heat, and a donut maker with a base and a cover. The base has a head defining a recess for receiving batter and the cover has a lid for engaging over the recess. The head and lid have shapes and sizes to engage into the opening so that when the batter has been cooked to a selected extent on one side, aligned handles connected to the head and lid are used to turn the donut maker over to cook the batter on the opposite side to create a donut.

Another object of the invention is to provide a donut making arrangement that is rouged in design, simple in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
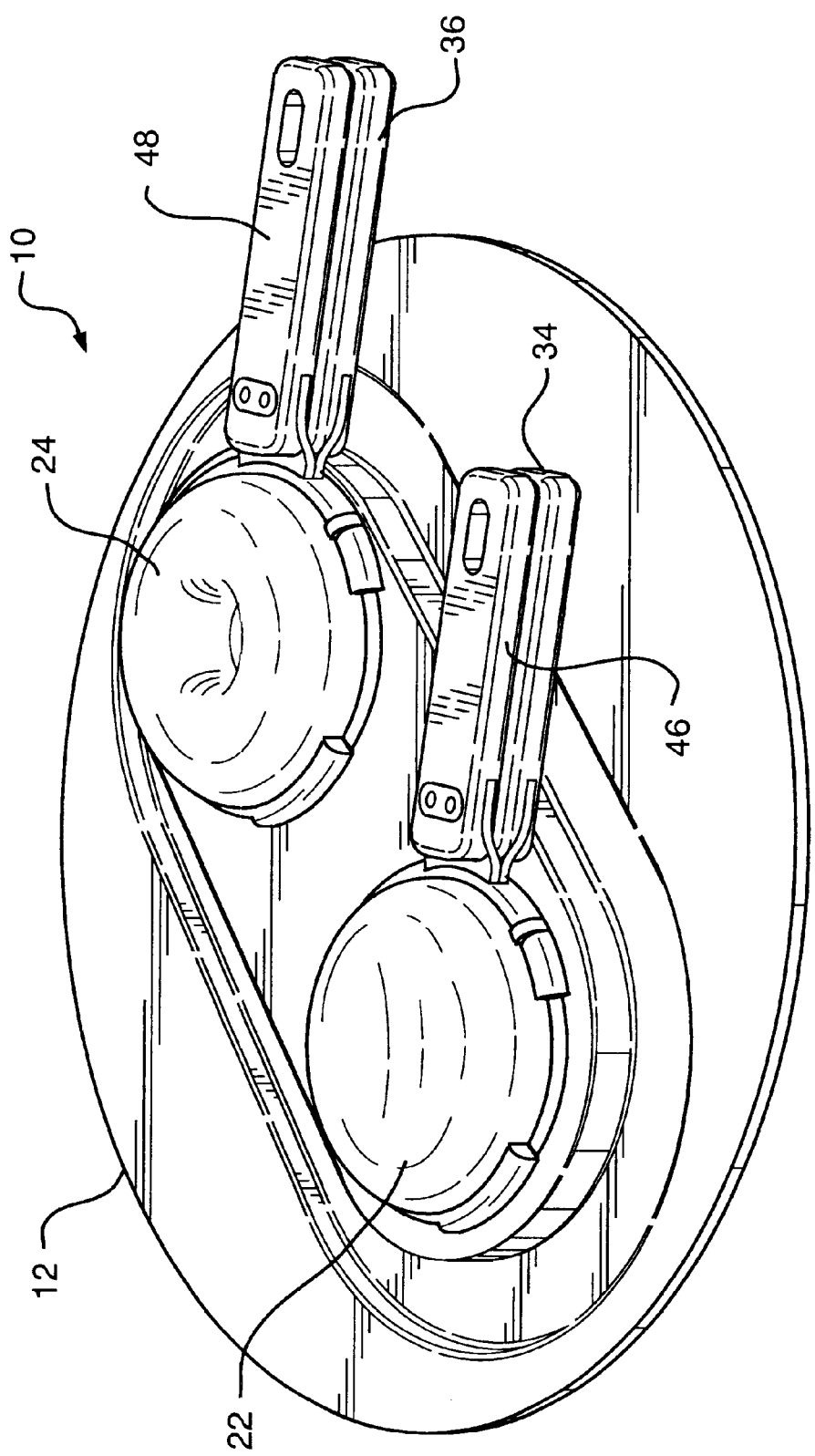
FIG. 1 is a perspective view of a donut making arrangement of the invention.
Figure 2:
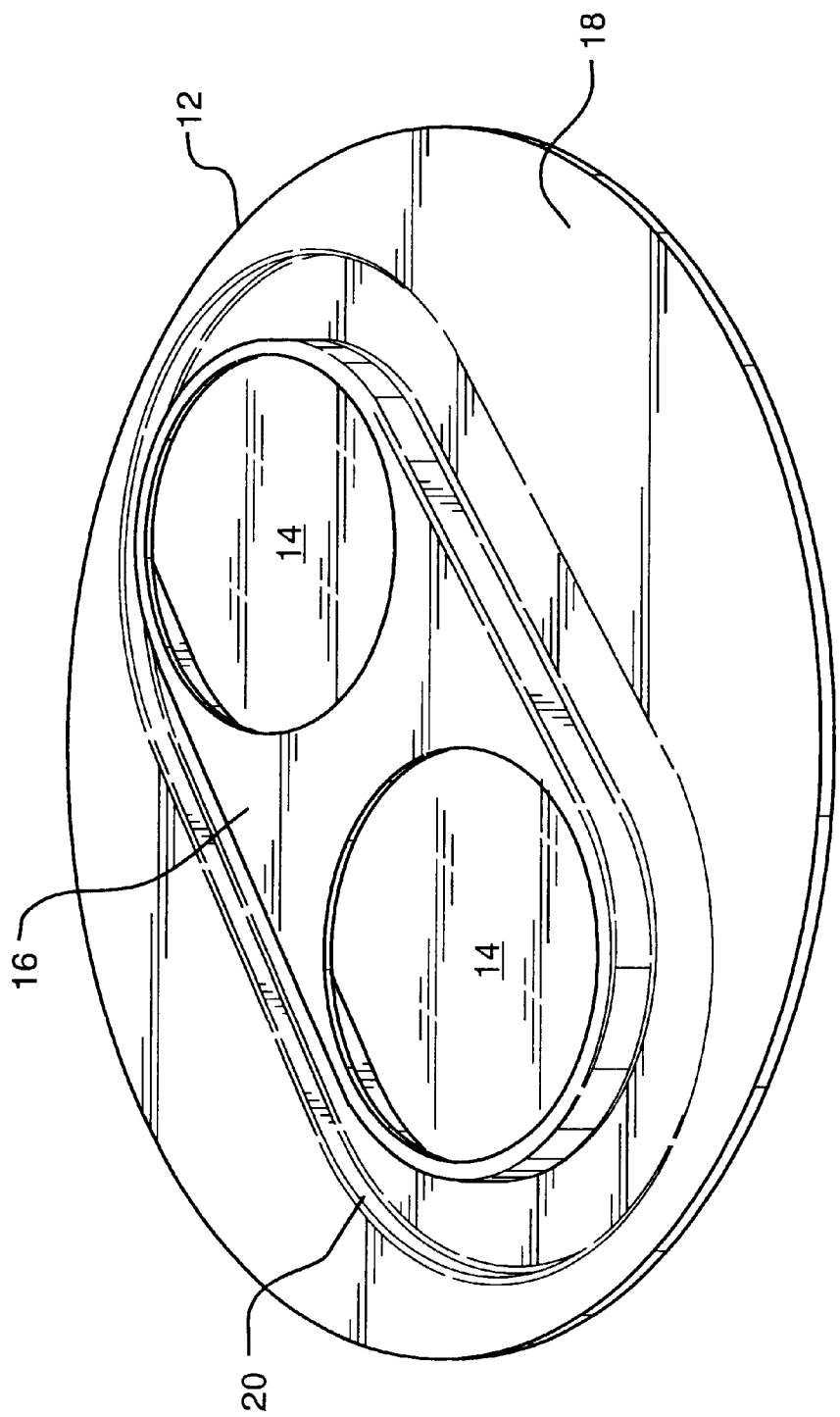
FIG. 2 is a perspective view of a tray of the arrangement of FIG. 1.

Referring now to the drawings, in which like reference numerals are used to refer to the same or similar elements, FIG. 1 illustrates a donut making arrangement generally designated 10 which comprises a circular metal drip tray 12 adapted to be placed over a source of cooking heat such as a stove top burner of electric heating element. As shown in FIG. 2, the tray 12 has at least one, and, in the embodiment shown, two opening 14 therein.

Tray 12 includes a central raised portion 16 containing openings 14, a raised outer portion 18 that covers the heating element or burner area, and a depressed annular drip channel 20 extending around the raised central portion 16 and between the central and outer portions. Channel 20 collects any batter might drip from a donut maker proper to be described later in this disclosure.

Tray 12 is make of metal, e.g. aluminum or stainless steel, to resist the cooking heat, and be treated on its top surfaces with non-stick material of known type for easy clean-up.

Figure 4:
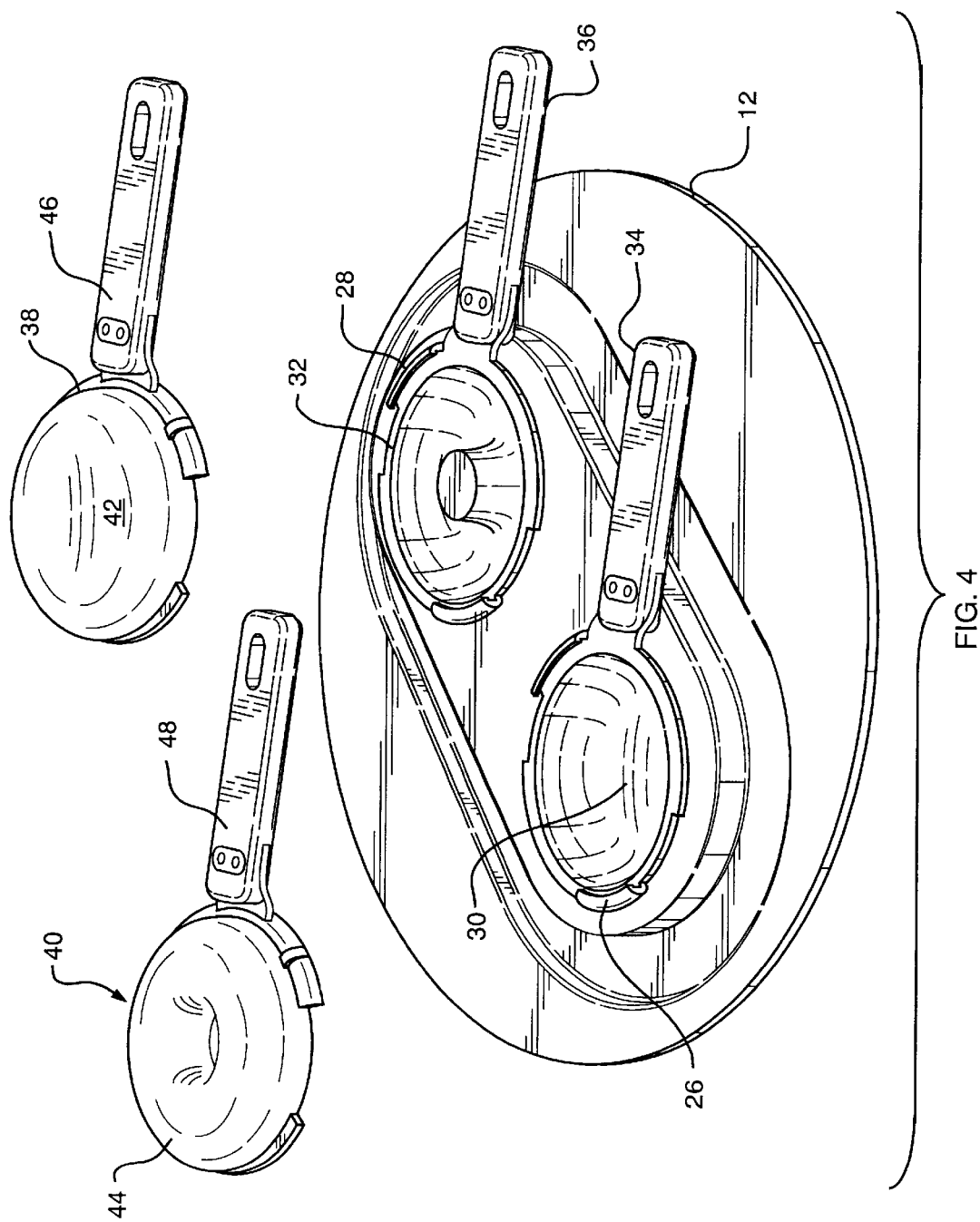
FIG. 4 is an exploded view of the arrangement.

The invention also includes one or more donut makers 22 and 24 shown in FIG. 1. Each donut maker has a base 26 and 28 with a head 30 and 32, respectively, defining a recess for receiving a donut batter to be cooked to form a donut. Each head has a shape and size to engage into one of the openings 14 of the tray 12 for being heated by the source of cooking heat. Each base includes a handle 34 and 36 respectively, extending beyond the tray 12 when the head is in the opening as shown in FIG. 4. The handles are used to hold and move the heads.

Each donut maker 22 and 24 also includes a cover 38 and 40 respectively, each with a lid 42 and 44 respectively for engaging its associated the head 30 and 32, to cover the recess after the batter has been added. Each lid also has a shape and size to engage into any one of the openings 14, so that when the lid is engaged to the head and the head is engaged in the opening and the batter has been cooked to a selected extent on one side, the handle can be used to turn the donut maker over to engage the lid into the opening and cook the batter on an opposite side to a selected extent. In the preferred form of the invention, each cover 38 and 40 also has a respective handle 46 and 48, extending from the lid.

Figure 3:
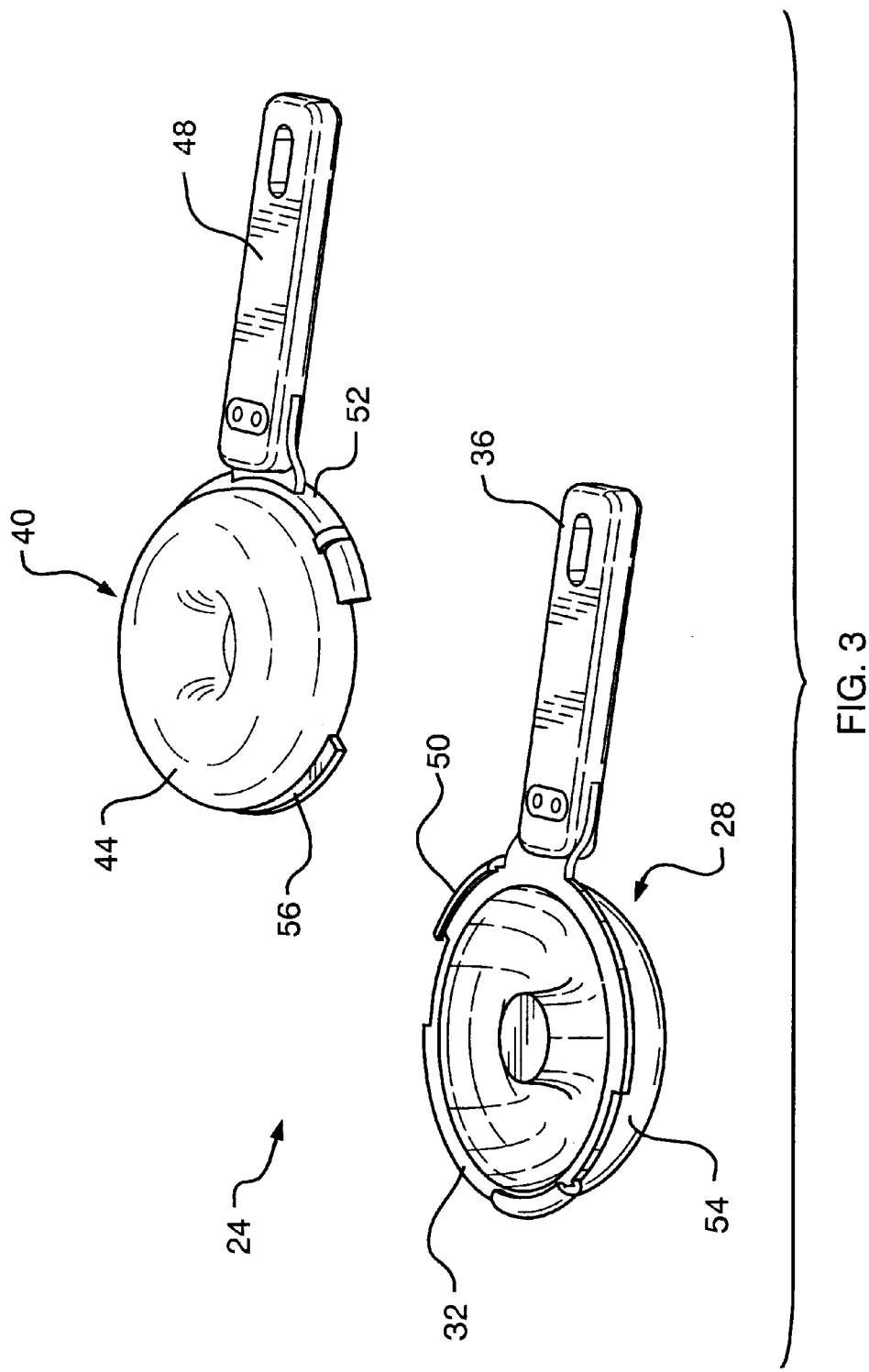
FIG. 3 is an exploded view of a donut maker of the arrangement.

Locking means are provided between the head and the lid for locking the head to the lid when the handles 34, 46 and 36, 48 are aligned to each other as best shown in FIG. 1. The locking means preferably comprises at least one arcuate channel 50 and 52, and at least one arcuate blade 54 and 56, spaced around the rim of each of the lid 32 and head 44, for engaging each other to form a bayonet connection between the lid and the head of the donut maker 24 (see FIG. 3). The donut maker 22 has the same locking means.

In the preferred form of the invention, each lid also defines a recess for the batter with each cover being a mirror image in shape and size to its respective base. The recesses of the lid and the head of each donut maker 22 and 24 are circular in configuration. For the donut maker 22, the lid 38 and the head 30 are spaced from each other at a center of the recess for defining as donut making volume that has no hole. This structure is used to bake a donut with no hole that can be filled with jelly or cheese to create a jelly or cheese donut (yum).

For donut maker 24 (see FIG. 3 again), the lid 32 and head 44 are adjacent each other and actually touch each other at a center of the recess for defining an annular donut making volume that has a hole to create, in turn, donuts with holes therethrough.

Although tray 12 is shown with two openings 14, the tray may have only one hole or three or more holes within the scope of this invention, to accommodate a corresponding number of donut makers.

Inner surfaces of the lid and the head that come into contact with batter, are coated with a non-stick material of know type.

Figure 5:
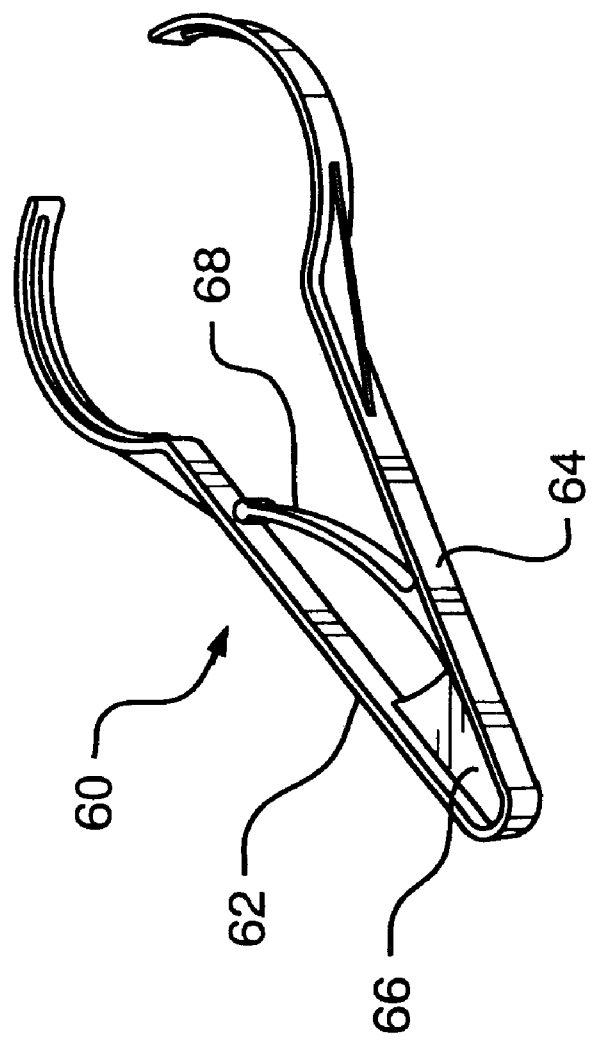
FIG. 5 is a perspective view of a donut tong of the arrangement.

The arrangement of the invention includes a donut tong 60 in FIG. 5 for removing a donut cooked in one of the donut makers. The tong 60 has an pair of arms 62, 64 connected to each other at an apex 66 and a spring 68 for spreading the arms apart for receiving a donut. The tong 60 is make, e.g.

via injection molding, of a single piece of resilient plastic and the spring 68 is formed by a projection extending at an acute angle from one arm 64, and engaged against the other arm 62.

While a specific embodiment of the invention has been shown and described in detail to illustrate the application of the principles of the invention, it will be understood that the invention may be embodied otherwise without departing from such principles.

What is claimed is:

1. A donut making arrangement comprising:

a drip tray adapted to be placed over a source of cooking heat, the tray having at least one opening therein; and a donut maker, the donut maker having a base with a head defining a recess for receiving a donut batter, the head having a shape and size to engage into the opening of the tray for being heated by the source of cooking heat, the base including a handle extending beyond the tray when the head is in the opening for moving the head;

the donut maker having a cover with a lid for engaging the head to cover the recess, the lid having a shape and size to engage into the opening so that when the lid is engaged to the head and the head is engaged in the opening and the batter has been cooked to a selected extent on one side, the handle is used to turn the donut maker over to engage the lid into the opening and cook the batter on an opposite side to a selected extent.

2. An arrangement according to claim 1, wherein the cover has a handle extending from the lid, the arrangement including locking means between the head and the lid for locking the head to the lid with the handles aligned to each other.

3. An arrangement according to claim 2, wherein the lid also defines a recess for the batter.

4. An arrangement according to claim 3, wherein the recesses of the lid and the head are circular.

5. An arrangement according to claim 4, wherein the lid and the head are spaced from each other at a center of the recess for defining a donut making volume that has no hole.

6. An arrangement according to claim 4, wherein the lid and the head are adjacent each other at a center of the recess for defining a donut making volume that has a hole.

7. An arrangement according to claim 2, wherein the locking means comprises each of the lid and head having a rim and at least one channel and at least one blade spaced around each rim for engaging each other to form a bayonet connection between the lid and the head.

8. An arrangement according to claim 1, wherein the tray has a second opening therein and the arrangement includes a second donut maker having a base with head and a cover with lid for engaging the second opening.

9. An arrangement according to claim 1, wherein the tray includes a central raised portion containing the at least one opening, a raised outer portion and a depressed drip channel extending around the raised central portion and between the central and outer portions for collecting any batter that has dripped from between the head and engaged lid out of the recess.

10. An arrangement according to claim 1, wherein inner surfaces of the lid and the head that are adapted to come into contact with batter, have a non-stick material thereon.

11. An arrangement according to claim 1, including a donut tong for removing a donut cooked in the donut maker, from the donut maker, the tong having an pair of arms connected to each other at an apex and a spring for spreading the arms apart for receiving a donut.

12. An arrangement according to claim 11, wherein the tong is make of a single piece of resilient plastic and the spring is formed by a projection extending at an acute angle from one arm and engaged against the other arm.

\* \* \* \* \*